H. C. RABER.
LOCK SWITCH.
APPLICATION FILED NOV. 23, 1917.

1,408,396.

Patented Feb. 28, 1922.
2 SHEETS—SHEET 1.

Inventor
H. C. Raber

Witnesses

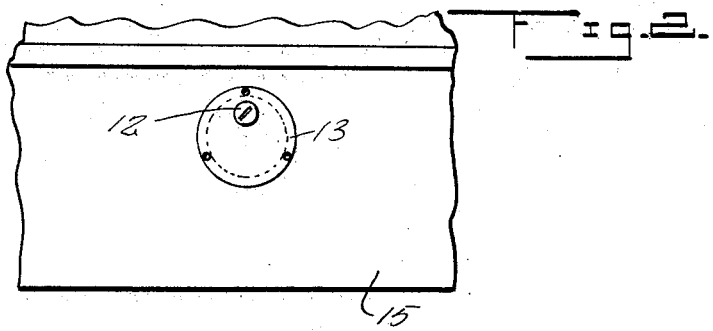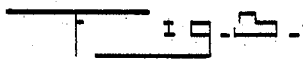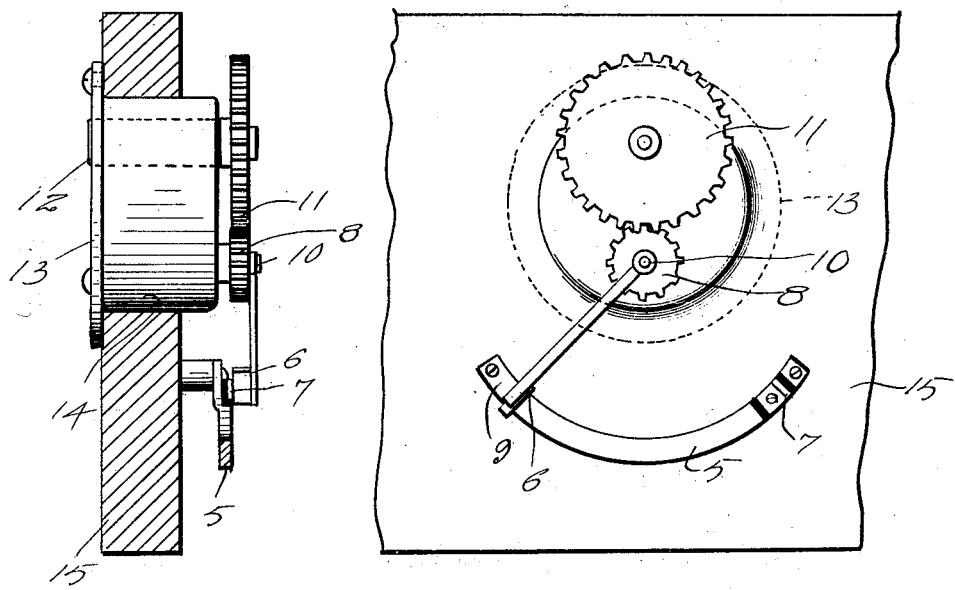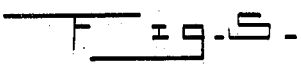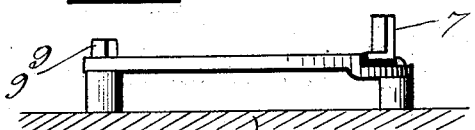

UNITED STATES PATENT OFFICE.

HARRY C. RABER, OF VANZANT, MISSOURI, ASSIGNOR OF ONE-HALF TO WILLIAM R. BARKER, OF VANZANT, MISSOURI.

LOCK SWITCH.

1,408,396.  Specification of Letters Patent.  Patented Feb. 28, 1922.

Application filed November 23, 1917. Serial No. 203,562.

*To all whom it may concern:*

Be it known that I, HARRY C. RABER, a citizen of the United States, residing at Vanzant, in the county of Douglas and State of Missouri, have invented certain new and useful Improvements in Lock Switches; and I do hereby declare the following to be a full, clear, and exact description of the invention, such as will enable others skilled in the art to which it appertains to make and use the same.

This invention relates to an automobile burglar alarm.

The object of the present invention is to provide a simple, practical and efficient automobile burglar alarm of strong, durable and comparatively inexpensive construction adapted to be readily applied to various types of automobiles and capable, when in locked position, of sounding an alarm and of thereby warning the owner of the machine, and others, that the same is being stolen or driven by an unauthorized person.

With these and other objects in view, the invention consists in the construction and novel combination of parts hereinafter fully described, illustrated in the accompanying drawings and pointed out in the claims hereto appended; it being understood that various changes in the form, proportion, size and minor details of construction, within the scope of the claim may be resorted to without departing from the spirit or sacrificing any of the advantages of the invention.

In the drawings:

Figure 2 is an elevation of a portion of a dash illustrating a convenient arrangement of the lock.

Figure 3 is a sectional view of the same, the lock and the gearing being shown in side elevation.

Figure 4 is a rear elevation of the same and the switch operated by the gearing.

Figure 5 is a detail view of the switch.

Like numerals of reference designate corresponding parts in all the figures of the drawings.

Figure 1:
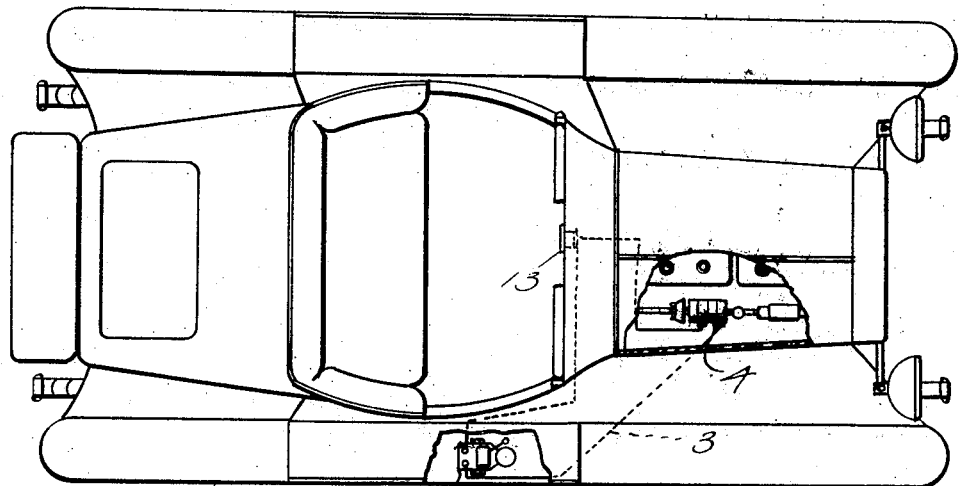
Figure 1 is a plan view of an automobile partly broken away and equipped with an automatic burglar alarm constructed in accordance with this invention.
Figure 6:
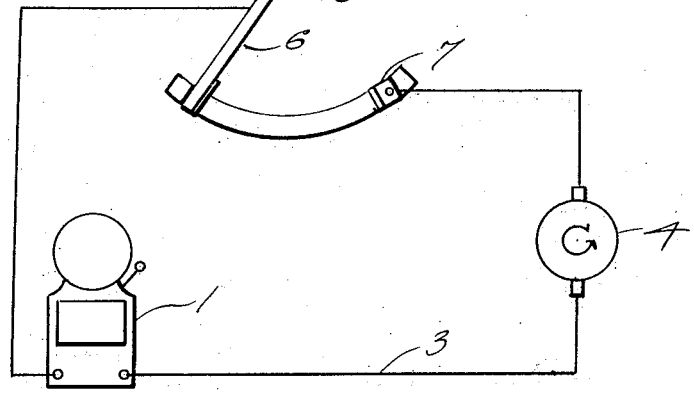
Figure 6 is a plan view of the automobile burglar alarm circuit.

In the accompanying drawings, in which is illustrated the preferred embodiment of the invention, the automobile burglar alarm comprises in its construction an electric bell 1 of any desired construction and preferably of a size to enable it to be heard for several blocks so that when the alarm is sounded the owner and others within hearing distance will be notified that the machine is being unlawfully taken by an unauthorized person. The bell, which may be mounted beneath the running board, or any other portion of the automobile 2, is arranged in a burglar alarm circuit 3 including the generator 4 of the automobile and designed to be arranged in shunt with the engine or motor circuit so that it will not interfere with the operation of the automobile either when open or closed. When the automobile burglar alarm circuit is closed and the automobile is started, the current from the magneto or generator will ring the bell and sound the alarm, and when the burglar alarm circuit is open, the automobile may be operated without ringing the bell 1.

The burglar alarm circuit also includes a switch having an arm or quadrant 5 serving as a rest or means to normally retain an oscillatory or pivoted switch arm 6 which is movable to and from a contact 7 whose upper surface is flush with that of the arm 5 to open and close the burglar alarm circuit. Arm 6 is carried by a pinion or gear 8. One of the wires or conductors of the burglar alarm circuit is connected with the contact 7 and another of the wires or conductors is suitably connected with the switch arm so that when the switch arm 6 is in contact with the switch contact 7, the circuit will be closed.

The arm 5 and the contact 7 will be suitably insulated and the arm 5 is provided at the end, opposite that at which the contact 7 is located, with a suitable stop 9 for limiting the movement of the switch arm in one direction, the contact 7 being supported on and insulated from a deflected portion of arm 5 and preferably in the form of an L-shaped thread or piece for limiting the movement of the switch arm in the opposite direction. Any form of contact may of course be employed, and the conductors may be connected with the members of the switch in any preferred manner. The pinion or gear 8, which is mounted on a suitable shaft or spindle 10, meshes with a gear wheel 11 which is connected with and carried by the cylinder or rotary element 12 of a lock 13 which may be of any preferred construction or make of this type and which is adapted to be operated by a key in the usual manner and, when the cylinder or rotary member, is partially rotated, the switch arm will be oscillated and will be moved to or from the contact 7 according to the direction in which the cylinder or rotary member is moved. The pivot or spindle 12 may be in the form of a stub shaft mounted on the lock casing, as indicated in Figure 3, or it may be arranged in any desired manner and, while it is preferable to mount the lock 13 in an opening 14 of the dash 15, it may be arranged in any other desired position so as to be out of the way or more or less concealed from view. When the lock 13 is moved or operated to swing the switch arm into contact with the contact plate 7, the circuit of the burglar alarm will be closed and any operation of the machine will cause the generator to supply the automobile burglar alarm circuit with current for ringing the bell 1. When the lock is operated to open the switch 5, the machine may be run without ringing the bell 1 and the device will not thereby affect the operation of the machine or use any of the current of the same except when the burglar alarm circuit is closed and the machine is unlawfully operated.

What is claimed is:

A switch device including a key-operated lock, means turnable by operation of the key having a gear wheel, a gear wheel smaller than said gear wheel in driving relation therewith and journalled on the lock, an arm operated by the second gear wheel, a rest means and contact with substantially flush surfaces over which said arm travels and stops, one on said rest means and one on said contact to limit movement of the arm.

In testimony whereof I affix my signature in presence of two witnesses.

HARRY C. RABER.

Witnesses:
JAMES SMITH,
RUBY TAYLOR.